United States Patent
Jagannath et al.

(10) Patent No.: US 12,556,913 B2
(45) Date of Patent: Feb. 17, 2026

(54) SYSTEM AND METHODOLOGY FOR SECURE COEXISTENCE BETWEEN WIRELESS FIDELITY AND CELLULAR NETWORKS

(71) Applicant: ANDRO Computational Solutions, LLC, Rome, NY (US)

(72) Inventors: Jithin Jagannath, Oriskany, NY (US); Anu Jagannath, Oriskany, NY (US); Andrew Louis Drozd, Rome, NY (US); Keyvan Ramezanpour, New Hartford, NY (US)

(73) Assignee: ANDRO COMPUTATIONAL SOLUTIONS, LLC, Rome, NY (US)

( * ) Notice: Subject to any disclaimer, the term of this patent is extended or adjusted under 35 U.S.C. 154(b) by 651 days.

(21) Appl. No.: 17/822,458

(22) Filed: Aug. 26, 2022

(65) Prior Publication Data
US 2023/0074107 A1   Mar. 9, 2023

Related U.S. Application Data

(60) Provisional application No. 63/238,497, filed on Aug. 30, 2021.

(51) Int. Cl.
*H04W 12/06* (2021.01)
*H04W 12/08* (2021.01)
*H04W 74/0808* (2024.01)
*H04W 16/14* (2009.01)

(52) U.S. Cl.
CPC ........... *H04W 12/06* (2013.01); *H04W 12/08* (2013.01); *H04W 74/0808* (2013.01); *H04W 16/14* (2013.01)

(58) Field of Classification Search
CPC .............................. H04W 12/06; H04W 16/14
USPC .......................................................... 455/411
See application file for complete search history.

(56) References Cited

U.S. PATENT DOCUMENTS

| | | | |
|---|---|---|---|
| 2010/0199089 A1* | 8/2010 | Vysogorets | G06F 21/34 713/168 |
| 2013/0042110 A1* | 2/2013 | Shablygin | G06F 21/34 713/168 |

* cited by examiner

*Primary Examiner* — Qutbuddin Ghulamali
(74) *Attorney, Agent, or Firm* — Hoffman Warnick LLC

(57) ABSTRACT

Embodiments of the disclosure provide a system and methodology for secure coexistence between wireless fidelity and cellular networks. Methods include: determining whether a wireless fidelity (WiFi) device is sharing a spectrum of a network; and adjusting a parameter of a cellular device sharing the spectrum in response to determining that the WiFi device is sharing the spectrum, wherein the parameter includes a modulation and coding scheme or a transmission power of the cellular device. Methods further include controlling admission of users to a communications network, including: determining whether an incoming transmission is an authentication request from a new user; issuing a temporary authentication to the user to transmit a set of access requirements to the user; determining whether a reply from the user complies with the set of access requirements; and issuing a long-term authentication to the user in response to the reply complying with the set of access requirements.

14 Claims, 9 Drawing Sheets

SYSTEM AND METHODOLOGY FOR SECURE COEXISTENCE BETWEEN WIRELESS FIDELITY AND CELLULAR NETWORKS

BACKGROUND

1. Technical Field

The present disclosure relates to communication systems. Specifically, embodiments of the disclosure provide a system and methodology for coexistence between wireless fidelity (WiFi) and cellular networks.

2. Background Art

With the unprecedented scale of Internet of Things (IoT) devices for entertainment, federal applications, smart home, industrial automation, and other smart connected infrastructure, the relentless demand for scarce spectrum resources is increasing. There is an emerging interest to design spectrum coexistence methodologies whereby communication technologies (standards) hosted by different internet and cellular service providers can share the scarce spectrum with at most negligible effect on communication performance as indicated by metrics such as throughput, latency, user density, among others. Coexistence schemes must consider the ease of adoption to accommodate the billions of already deployed devices. Consequently, subsequent revisions to the physical layer (L1), medium access control layer (L2) of handsets, or any other upper layers would imply hardware revisions to preexisting devices.

SUMMARY

The illustrative aspects of the present disclosure are designed to solve the problems herein described and/or other problems not discussed.

Aspects of the disclosure provide a method including: determining whether a wireless fidelity (WiFi) device is sharing a spectrum of a network; and adjusting at least one parameter of a cellular device sharing the spectrum of the network in response to determining that the WiFi device is sharing the spectrum of the network, wherein the at least one parameter includes a modulation and coding scheme (MCS) of the cellular device or a transmission power of the cellular device.

Another aspect of the disclosure provides a method for controlling admission of users to a communications network, the method including: determining whether an incoming transmission is an authentication request from a new user; issuing a temporary authentication to the user to transmit a set of access requirements to the user; determining whether a reply from the user complies with the set of access requirements; and issuing a long-term authentication to the user in response to the reply complying with the set of access requirements.

A further aspect of the disclosure provides a system including a network, a plurality of devices sharing a spectrum of the network, and a module for adjusting at least one parameter of at least one of the plurality of devices, wherein the module is configured to perform actions including: determining whether a wireless fidelity (WiFi) device is sharing the spectrum of the network; and adjusting at least one parameter of a cellular device sharing the spectrum of the network in response to determining that the WiFi device is sharing the spectrum of the network, wherein the at least one parameter includes a modulation and coding scheme (MCS) of the cellular device or a transmission power of the cellular device.

An additional aspect of the disclosure provides a ticketing system for controlling admission of users to a communications network, the ticketing system configured to perform actions including: determining whether an incoming transmission is an authentication request from a new user; issuing a temporary authentication to the user to transmit a set of access requirements to the user; determining whether a reply from the user complies with the set of access requirements; and issuing a long-term authentication to the user in response to the reply complying with the set of access requirements.

DETAILED DESCRIPTION

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Radio access technologies (RATs) perform Clear Channel Assessment (CCA) techniques to access channels for communication via a network. Such processes operate by determining whether sensed energy is above a pre-defined threshold to deem whether a channel is busy or idle. Energy higher than the threshold indicates a busy channel, while energy equal to or less than the threshold indicates an idle channel. Communication via cellular networks and wireless fidelity networks relies on CCA for operation. However, the CCA mechanisms for each type of network are different. For instance, in the IEEE802.11ax standard (also known as WiFi6/6E, hereafter referred to as "WiFi" for simplicity), connected devices use a technique known as "CCA Mode-3," whereby they perform preamble detection based CCA to sense BUSY/IDLE media as a default. The process may perform a different technique (e.g., CCA Mode-1 energy detection-based assessment) as a fallback for indeterminate outcomes. This enables WiFi devices to recognize other WiFi devices in their vicinity and distinguish those devices from non-WiFi devices during CCA implementation.

In the case of cellular networks, however, 3GPP Release-16 based 5G NR-U (new radio unlicensed) devices implement only the CCA Mode-1 assessment, allowing them to only detect devices without being able to distinguish the devices as belonging to a self-RAT group (i.e., whether they are WiFi or cellular). The CCA Mode-1 is also referred to as Listen Before Talk (LBT). Current implementations support four types of LBT detection: always ON; LBT without random backoff; LBT with random backoff; and LBT with exponential random backoff. Further complications may arise since the CCA Mode-3 energy threshold of WiFi is −82 decibel-milliwatts (dBm), while the CCA Model energy threshold is −62 dBm, causing such techniques to be fair to other WiFi devices but interfering with other RATs in the vicinity.

Figure 1:
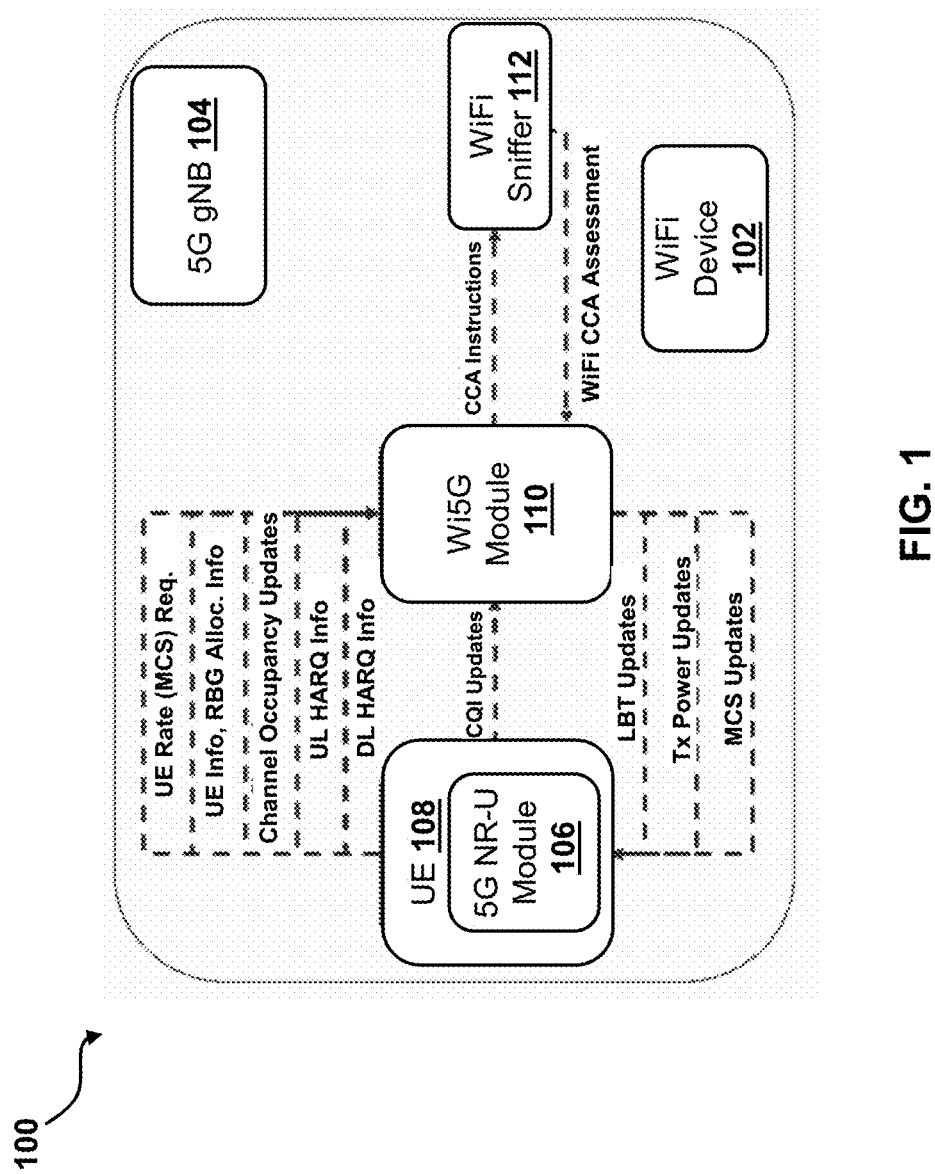
FIG. 1 shows an illustrative diagram of a system for enabling coexistence between wireless fidelity (WiFi) devices and cellular devices in a network according to embodiments of the disclosure.

A system 100 for enabling fair coexistence between WiFi connected devices and cellular connected (e.g., 5G) devices in a network (e.g., a 5G network) according to embodiments of the disclosure is depicted in FIG. 1. As shown, the system 100 in this example is configured to detect an active WiFi device 102 sharing the spectrum of a 5G network base station (5G gNB) 104 and to adjust the parameters of a 5G NR-U module 106 (e.g., included in user equipment (UE) 108 such as a radio handset) to enable more efficient spectrum coexistence (e.g., to increase network capacity and channel utilization under fairness constraint(s)). According to embodiments of the disclosure, the system 100 further includes a Wi5G module 110, the operation of which is described in greater detail below. Although only one WiFi device 102 and one 5G NR-U module 106 are shown in FIG. 1, the system 100 may be used for enabling fair coexistence between a plurality of WiFi devices 102 and 5G NR-U modules 106. Further, according to embodiments of the disclosure, the system 100 may also be configured to detect an active WiFi device 102 sharing the spectrum of a 5G network base station 104 and to adjust the parameters of other types of devices including, for example, long-term evolution licensed assisted access devices (LTE-LAA) devices, LTE in unlicensed spectrum (LTE-U) devices, and the like.

In the system 100, according to embodiments of the disclosure, the 5G gNB base station 104 may include a WiFi "sniffer" 112 for identifying WiFi devices 102 sharing the spectrum of the 5G gNB base station 104. This may be achieved, for example, by recognizing WiFi signals present in the spectrum. The WiFi sniffer 112 may be incorporated in the Wi5G module 110 itself or may be provided in a separate module communicatively coupled to the Wi5G module 110. In the system 100, the Wi5G module 110 communicates with the 5G NR-U module 106 of the UE 108, the WiFi sniffer 112, and the 5G gNB base station 104.

The Wi5G module 110 may reside at a WiFi access point (AP) as well, in which case the architecture will permit the Wi5G module 110 to interface with the WiFi card of the AP. In a 5G NR-U scheme, the resource block group (RBG) allocation for the UEs 108 may be performed by the 5G gNB base station 104 based on channel quality, available resources, traffic requirements, etc., of the UEs 108. The inclusion of the Wi5G module 110 within the 5G gNB base station 104 assists with such allocation. The WiFi AP also may determine the transmission opportunity for UEs 108 or WiFi Stations (STAs), increasing the usefulness of the AP as being the site for the Wi5G module 110.

Figure 2:
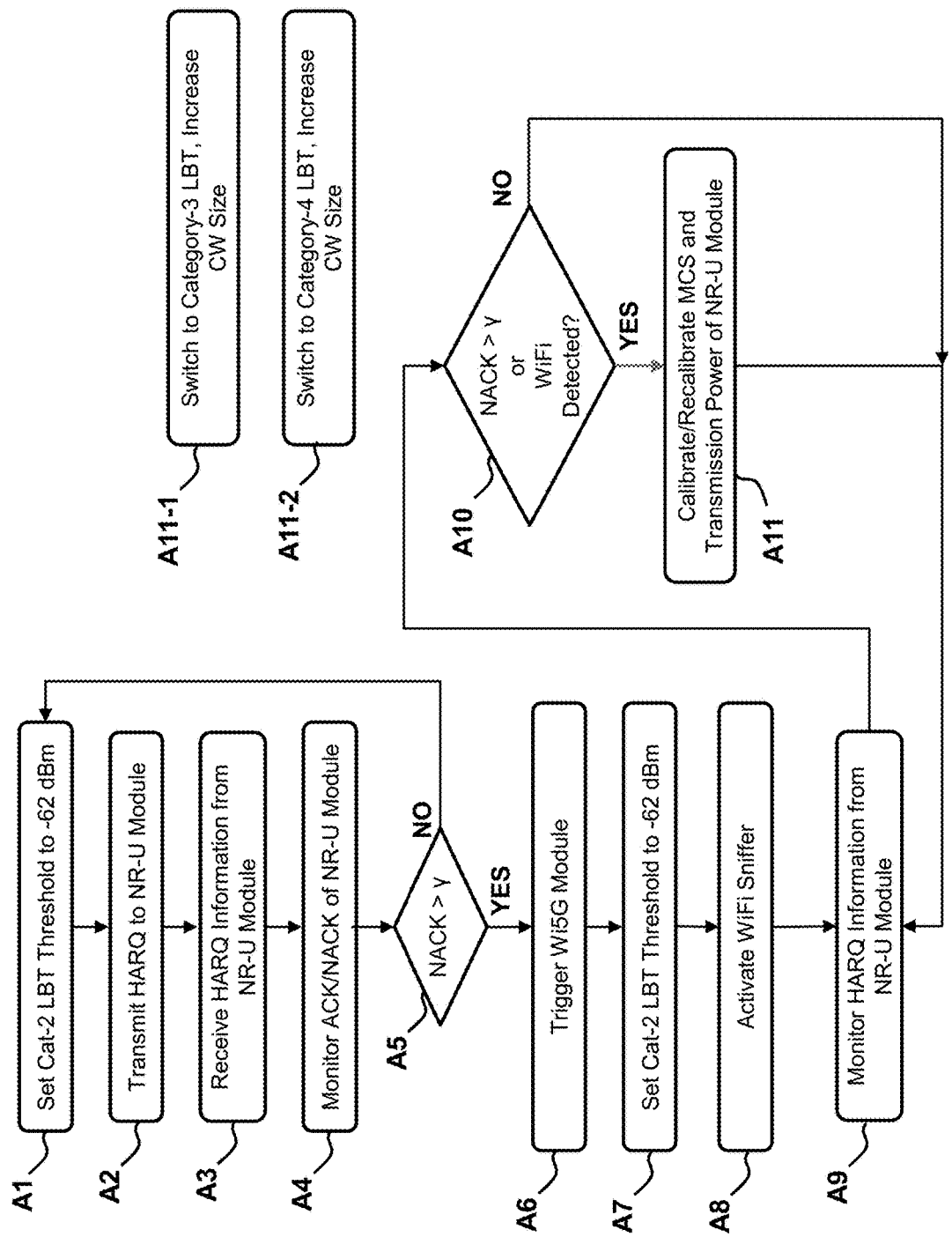
FIG. 2 shows a cellular network schema for coexistence between cellular and WiFi devices in a network according to embodiments of the disclosure.

As described above, referring now to FIGS. 1 and 2, the Wi5G module 110 residing at the 5G gNB base station 104 may promote fair coexistence of cellular network devices with WiFi devices 102. FIG. 2 shows a cellular network schema for coexistence between cellular devices and WiFi devices in a network according to embodiments of the disclosure. In this example, the 5G gNB base station 104 may transmit a hybrid automatic repeat request (HARQ) to the 5G NR-U module 106 of the UE 108 to attain information such as channel occupancy, traffic and rate requirements, etc., of the 5G NR-U module 106. In response, the Wi5G module 110 transmits studied decisions such as transmit power, modulation and coding scheme (MCS), LBT category, LBT thresholds, among others to the 5G gNB base station 104 to promote coexistence. The Wi5G module 110 may be activated to promote the coexistence methodology and may remain dormant when it is not needed (i.e., the network includes only WiFi or cellular-connected devices).

With continued reference to FIG. 2, a possible implementation scenario according to the disclosure is discussed. Initially, at process A1, communication begins with the Category-2 LBT threshold set to a first value (e.g., −62 dBm). At process A2, the 5G gNB base station 104 sends a HARQ to the 5G NR-U module 106 and, at process A3, the 5G NR-U module 106 sends the requested HARQ information back to the 5G gNB base station 104. At process A4, the acknowledgement (ACK) or negative acknowledgement (NACK) messages of the 5G NR-U module 106 during the communication is monitored by the 5G gNB base station 104. If at any point during the communication, the HARQ information from the 5G NR-U module 106 indicates NACKs above a pre-defined threshold ("γ") (YES at process A5), the Wi5G module 110 is triggered at process A6. If not (NO at process A5), flow passes back to process A1.

According to embodiments of the disclosure, the triggering of the Wi5G module 110 at process A6 may indicate a performance drop due to possible interference from the operational area. In this case, at process A7, the Wi5G module 110 reduces the Category-2 LBT threshold to a second, lower value (e.g., −72 dBm) and activates the WiFi sniffer 112 at process A8 to search for any nearby WiFi devices (e.g., WiFi device 102). At process A9, the Wi5G module 110 and/or the 5G gNB base station 104 continue to monitor the HARQ information from the 5G NR-U module 106 to identify subsequent performance improvement. At process A10, if performance has not improved as indicated by the NACKs, or if WiFi is detected (YES at process A10), the MCS and transmission power are calibrated (or recalibrated) at process A11 based, for example, on the channel quality indicator (CQI) and MCS requirements of the 5G NR-U module 106. Such calibrations by the Wi5G module 110 enable peaceful coexistence or cooperative spectrum sharing while operating in a WiFi6 operational area. The Wi5G module 110 and/or the 5G gNB base station 104 continues to monitor the HARQ information from the 5G NR-U module 106 at process A9 to detect changes in performance. Subsequent calibrations at process A11 may involve, for example, switching to Category-3 LBT and increasing the contention window (CW) size (process A11-1) and switching to Category-4 LBT and increasing the CW size (process A11-2). Increasing the CW may be implemented to reduce the number of packet collisions with any nearby WiFi network(s) by giving the nearby WiFi network(s) transmission opportunity. It is noted that methods according to the disclosure will facilitate coexistence of an NR-U network with not just WiFi6/6E, but also older generations of WiFi.

Systems and methods according to the disclosure may have a variety of practical applications. Seamless connectivity, low latency, and high mobility are distinct characteristics of 5G networks that support emerging applications such as autonomous vehicles, massive IoT networks, and high data rates. However, spectrum scarcity may limit capacity to achieve quality of experience (QoE) in a heterogenous network environment. Hence, spectrum sharing has drawn significant attention to provide seamless spectrum access through the multi-RAT technology of 5G networks. The spectrum sharing can be considered as a new layer in the communication protocol stack, or a sub-layer of the physical layer, which requires appropriate security measures.

Conventional approaches to allow spectrum sharing have focused exclusively on network performance, in terms of throughput and latency, and have postponed security provisions to the upper layers in the protocol stack. These approaches create significant security vulnerabilities in 5G networks. These vulnerabilities can lead to several security breaches in 5G networks if left unattended In one case, an attacker can impersonate a legitimate competitor for accessing the spectrum. The attacker can thus hijack significant portions of the spectrum without being detected by legitimate networks. In another case, the attack on the network access is broadened as the attacker can form a man-in-the-middle (MitM) position. Without a secure mechanism for spectrum sharing, the MitM attacker cannot be easily detected by legitimate networks and the respective users. In a third case, the attacker can bypass certain existing mitigation systems that inspect the network traffic. Since the spectrum is shared by multiple networks, the mitigation system in one network cannot distinguish between an attacker and a user of other networks.

Figure 3:
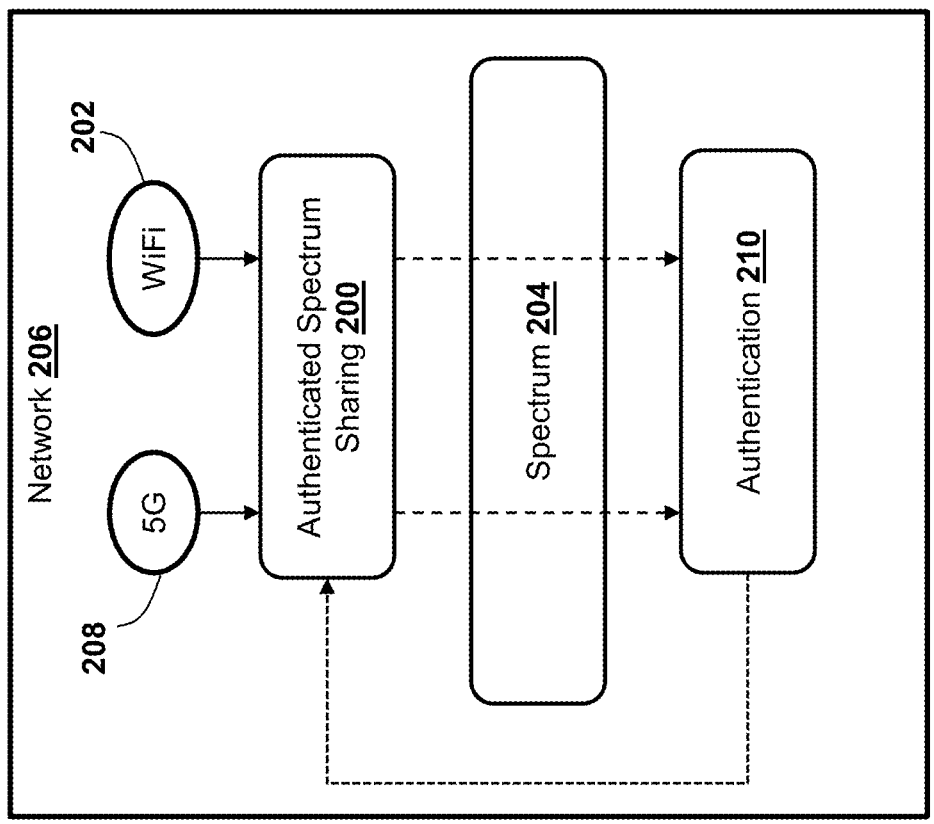
FIG. 3 depicts a secure authenticated spectrum sharing system for detecting active WiFi devices sharing the spectrum of a network that includes WiFi connected devices and cellular connected devices to enable coexistence and spectrum sharing in the network according to embodiments of the disclosure.

As depicted in FIG. 3, embodiments of the disclosure reduce or eliminate such concerns by providing a secure authenticated spectrum sharing system 200 for detecting active devices sharing the spectrum 204 of a network 206 that has WiFi connected devices 202 and cellular connected devices 208 to enable fair coexistence and spectrum sharing in the network 206. As described below, the authenticated spectrum sharing system 200 employs an authentication system 210 that provides a ticketing system 300 (FIG. 4) for authenticating network users desiring to access the spectrum 204 of the network 206.

Figure 4:
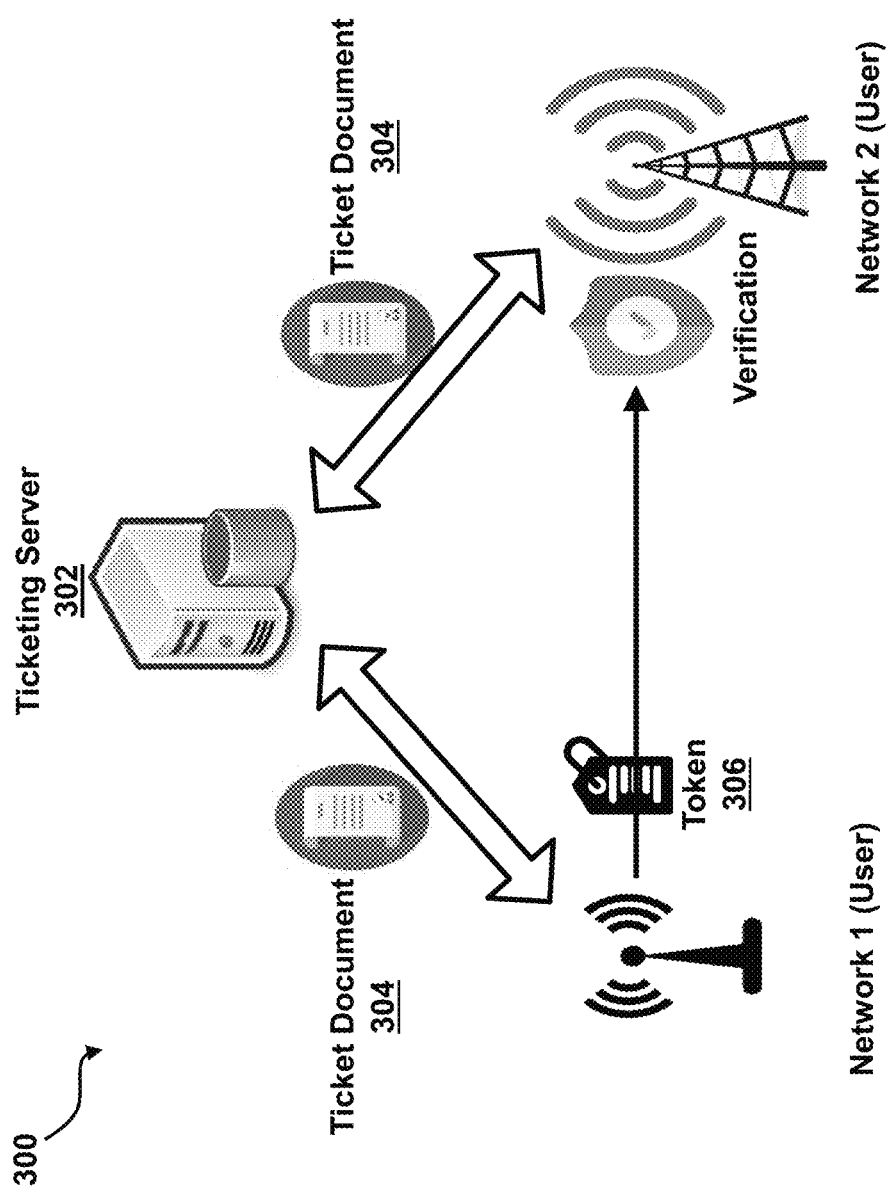
FIG. 4 provides a schematic view of a ticketing server and multiple users in a cellular and wireless fidelity network according to embodiments of the disclosure.

Referring to FIG. 4, according to embodiments of the disclosure, the ticketing system 300 includes a ticketing server 302 to identify legitimate users accessing the spectrum of a network. Embodiments of the disclosure additionally may include a zero trust (ZT) component that provides an extra level of security by characterizing any spectrum access activity. Authenticated spectrum sharing operates by allowing access to the spectrum of a network to only those users who have been authenticated by their respective networks, while also preserving the privacy of such users.

In accordance with embodiments of the disclosure, every user competing for spectrum access must show a valid ticket in the access request. The ticket can be verified by the users of all networks and is independent of the security credentials and identities of the users and networks. The high-level protocol of the authenticated spectrum sharing may include several operations. Any network operating in the shared spectrum acquires a set of secret credentials from the ticketing server 302. Only the networks having these credentials and the users authenticated by the networks can generate a valid ticket. The validity of tickets can be verified by all networks without having the secret credentials of their peer networks, thus providing a hybrid security platform with centralized and decentralized operators for controlling admission of new devices.

Figure 5:
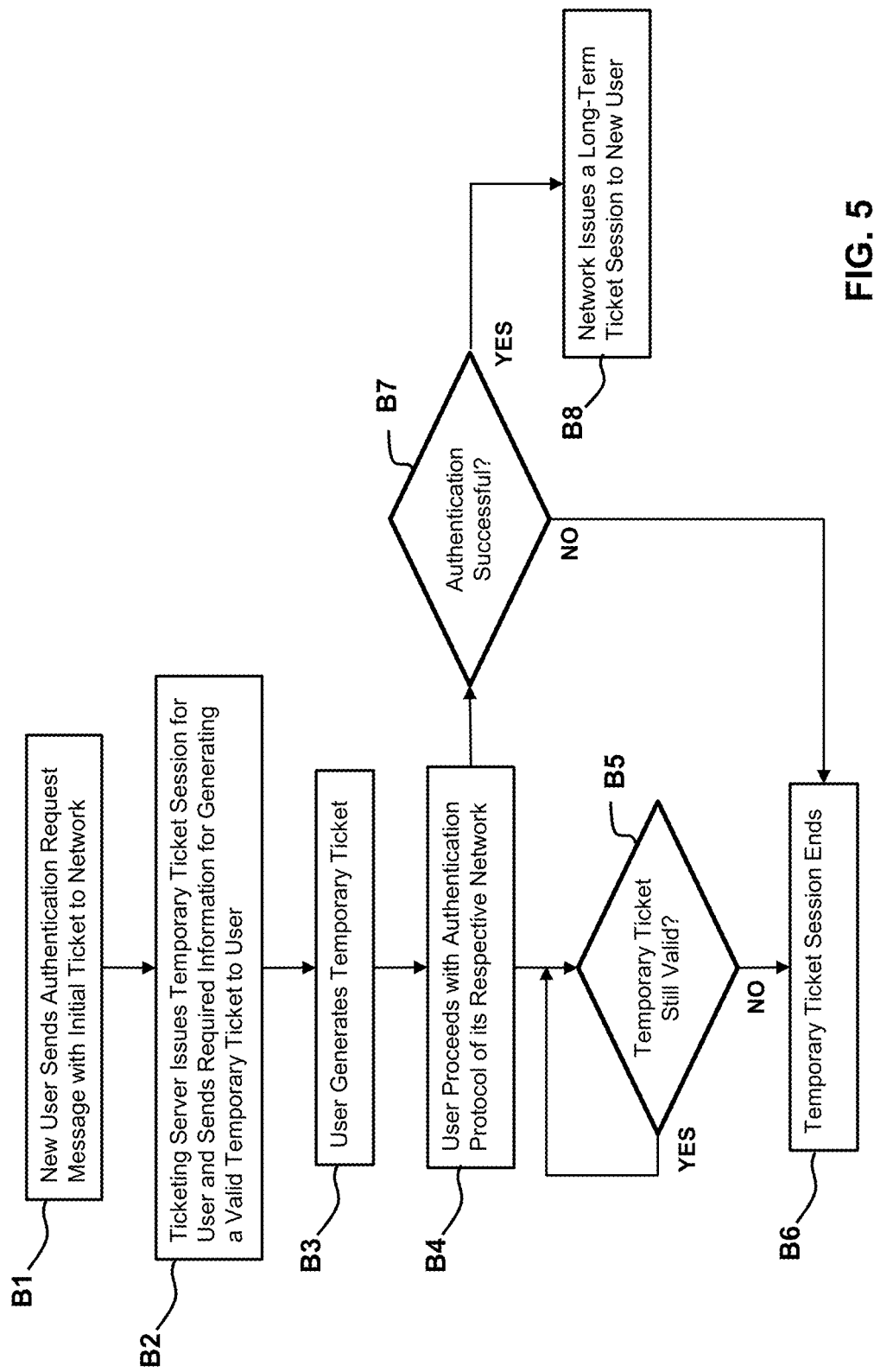
FIG. 5 depicts a process for issuing and verifying ticket documents according to embodiments of the disclosure.

Referring now to FIG. 5 (with reference to FIG. 4), at process B 1, a user connecting to a network for the first time sends an authentication request message with an initial ticket to the ticketing server 302 according to intra-network protocols. The initial ticket can be encrypted (for example using pre-shared secret credentials) or a public value (for example a default value). In the case of an encrypted ticket, only known legitimate users can identify the message as an authentication request. In the case of a public value, the message is identified as an authentication request publicly to all users/devices.

At process B2, the ticketing server 302, upon receiving the authentication request, issues a temporary ticket session for the new user and provides the required information for generating valid ticket documents 304 to the user. At process B3, the user generates a temporary ticket document 304 for this and all authentication exchanges based on this information.

At process A4, in response to the receipt of the information for the temporary ticket session, authentication of the user is performed using the authentication protocol of the user's respective network. The temporary ticket document 304 the user includes in the authentication messages is valid only for a limited number of message exchanges (i.e., sufficient for completing the authentication). To this extent, at process B5, the ticketing server 302 determines if the temporary ticket document 304 is still valid. If the temporary ticket 304 is no longer valid (NO at process B5), the temporary ticket session ends at process B6. If the temporary ticket document 304 is still valid (YES at process B5) validation of the temporary ticket document 304 is repeated at process B5.

At process B7, if authentication of the user fails (NO at process B7), the temporary ticket session ends at process B6. If the user successfully completes the authentication (YES at process B7) and the temporary ticket document 304 is still valid (YES at process B5), the ticketing server 302 issues a long-term ticket session for the user at process B8. The lifetime of the long-term ticket session lasts until the user is de-authenticated from the ticketing server 302. The ticket documents 304 generated in the long-term ticket session can be verified, where desired or applicable, by all legitimate users sharing the spectrum.

In some implementations, the ticketing server 302 may be managed via cloud-based servers compatible with the 3GPP service-based architecture (SBA) of 5G networks. Depending on the application and geographical areas of operation, different strategies for the ticketing server 302 can be implemented. Embodiments of the disclosure contemplate at least three strategies applicable to respective scenarios. One strategy includes a "federal-private sharing" paradigm. In this strategy, the ticketing server 302 is operated by a federal network and private networks acquire tickets from the ticketing server 302. In this scenario, the ticketing server 302 may issue ticket sessions to support a predetermined, limited number of spectrum accesses to a network by private networks. The ticketing server 302 may also issue tickets having different priority levels including highest priority access, priority access level, and general authorized access. This classification of access comports with FCC access levels for spectrum sharing. The users with tickets in the lower priority level(s) can access the spectrum only if a higher priority ticket is not waiting for the spectrum.

Another strategy includes a "private-private sharing" paradigm. Here, a trusted third-party server manages the ticketing server 302. All private networks acquire the ticketing credentials from this trusted third-party ticketing server 302. This strategy is beneficial for a spectrum sharing mechanism in which no network has predetermined advantage in accessing the spectrum over its peer networks. The trusted third-party server may also leverage distributed ledger technology, or blockchain, to record spectrum access.

Figure 6:
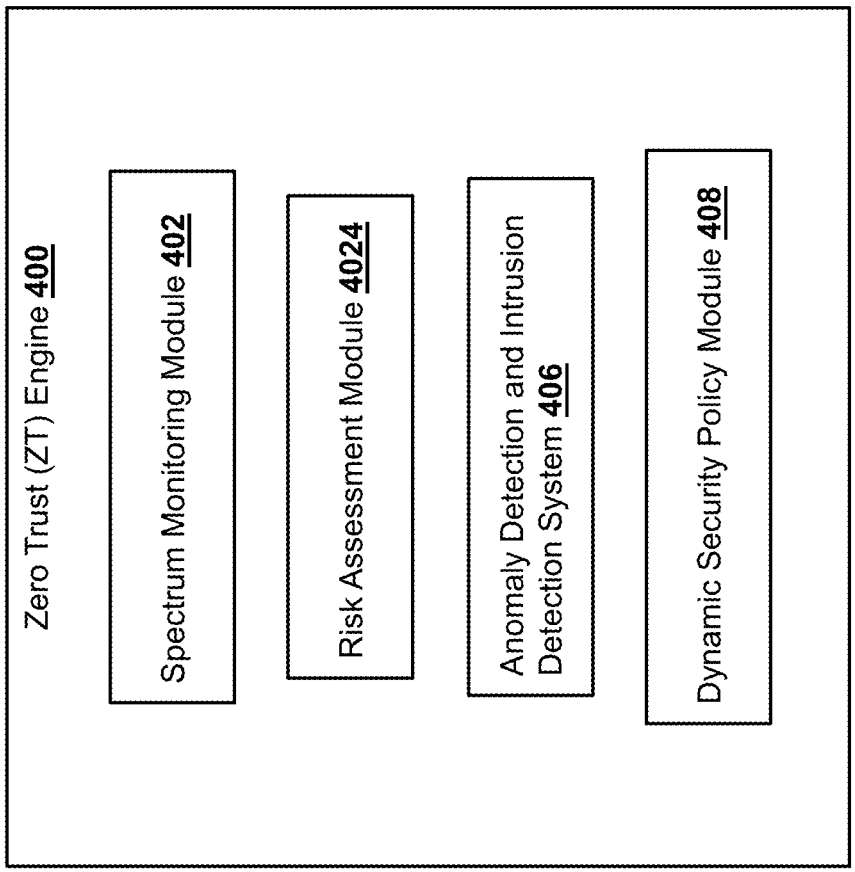
FIG. 6 depicts a Zero Trust (ZT) engine for monitoring out-of-network users accessing the shared spectrum and implementing a dynamic security policy to respond to potential attacks according to embodiments of the disclosure.

In embodiments of the disclosure, as depicted in FIG. 6, a Zero Trust (ZT) engine 400 may monitor activities of all users, including out-of-network users, accessing the shared spectrum and implement a dynamic security policy to respond to potential attacks. The ZT engine 400 may include multiple sub-components or sub-modules. A spectrum monitoring module 402 collects information such as spectrum usage, location/angle-of-arrival (AoA), and RF fingerprinting signatures to identify users and spectrum activity. A risk assessment module 404 may conduct a risk assessment on accessing the network based on the data collected by the spectrum monitoring module 402. The spectrum usage at a given location/AoA and by users with particular RF fingerprinting characteristics may be used in an anomaly detection and intrusion detection system (IDS) 406 to identify any potential attackers. A dynamic security policy module 408 can be implemented based on the risk assessment results. Actions such as key refreshing, sending secret cookies for re-authentication of certain users, and granting access to sensitive data and network resources through the shared spectrum, can be based dynamically on the risk assessment.

Technical concerns of ticketing systems have similarities with digital IDs and signatures. The process of ticketing includes issuing a ticket document (digital ID) and ticket verification (digital signature). It can also include a service endpoint that determines the spectrum band and geographical area of usage. According to embodiments of the disclosure, referring again to FIG. 4, the ticket document 304 may include verifiable credentials that include secret information only available to the parties authenticated to the ticketing server 302 and authorized for accessing the spectrum. The verification of a ticket document 304 may be performed using any cryptographic algorithm that allows a verifier to validate cryptographic content derived from the ticket document 304 and presented by the holder of the ticket document 304. An example of a ticket document 304 can be the data structure shown below:

TABLE 1

Example Ticket Document

| Ticket ID | Cell ID | Channel ID | User ID |
|---|---|---|---|
| Access Priority | Valid Date and Time of Usage | | Capacity |
| Priority 1 Secret | Priority 2 Secret | Priority 3 Secret | Priority 4 Secret |
| | Nonce & Cryptographic Secrets | | |
| | Usage Information | | |

Any party that requires access to the shared spectrum receives a ticket document 304 with the above content after authentication and authorization by the ticketing server 302. The content of some of the fields in the ticket document 304 can be different for users with different levels of access priority. As an example, only a user with the highest priority level has access to a secret value in the "Priority 1 Secret" field while users with lower priority receive a default value for the "Priority 1 Secret" field. The "Usage Information" field is completed by the user when using the ticket document 304 for accessing the spectrum. The content of the "Usage Information" field can include the number of times a ticket document 304 has been used and/or the current time. Other fields are shared with the same content with all parties involved in the spectrum sharing. After issuing the ticket document 304 to all parties, the system may generate a secret token 306 (FIG. 4) that is included in the request for accessing the spectrum. The token 306, where applicable, can be a digital signature of the ticket document 304, an encrypted version of the ticket document 304, or a digest of the ticket document 304 calculated using, for example, a cryptographic Hash function. The first party requesting access to the spectrum transmits the token 306 and other parties waiting for the spectrum verify the validity of the token 306.

As depicted in FIG. 4, during operation, networks and/or users sharing the spectrum may connect to the ticketing server 302 (e.g., within a base station, device, or elsewhere) to receive a ticket document 304. A first party ("Network 1" in FIG. 4) accessing the spectrum generates a secret token 306 derived from the ticket document 304. The verifying party ("Network 2" in FIG. 4) is waiting for the spectrum and verifies the legitimacy of the token 306. The process for deriving and verifying the token 306 can employ digital signature algorithms (DSA) which are based on public-key cryptography (PKC). However, PKC incurs high computational complexity especially in scenarios where multiple users require frequent access to the spectrum, and the corresponding verification of the token 306. Lightweight alternatives to verification of the token 306 may include symmetric-key cryptography and Hash functions. Embodiments of the disclosure, as discussed herein, provide further details of how these verification systems may be structured.

Digital signatures have legal liability in many countries including the United States. The algorithms for signing and verification are based on a public-key infrastructure (PKI). The signing party uses a pair of private and public keys. The public key is shared with the verifying party through a reliable channel which might not be secure. The channel should be reliable in the sense that the verifying party should be certain the advertised public key indeed belongs to the signing party. For this purpose, traditional PKI systems may employ a certificate authority (CA) which provides the public key corresponding to any user (e.g., signing party). The CA-based PKI systems are used in HTTPS protocol to establish secure connections.

In accordance with embodiments of the disclosure, the ticket document 304 is the message m which is already shared with all parties through the ticketing server 302. Further, the ticketing server 302 is similar to the certificate authority in PKI systems. The token 306 is the signature of the ticket document 304 calculated by the network (user) requesting access to the spectrum (signing party). The verifying network (user) receives the public key of the signing network from the ticketing server 302. Hence, the verifying network can verify if the signing network, accessing the spectrum, is legitimate.

In such implementations, the system can use digital signature algorithms and decentralized ID (DID) systems. The ticket document 304 does not need to be complex since most of the secret content of the ticket document 304 is inherent in the public-private key pair. Hence, a simple ticket document 304 is sufficient for a desired security level.

Implementing ticketing with different priority access levels may be performed as follows. For every priority level, a different pair of public/private keys are assigned. Hence, only a network (user) who has access to the private key of a high priority level can generate a legitimate ticket for that level. Further, networks (users) from lower levels can still verify the legitimacy of such tickets.

Conventional proposals in coexistence networks require the network base-stations (AP in WiFi and gNB in 5G) to compete for the spectrum and assign channels for its users. Hence, implementation of a ticketing server 302 based on digital signatures is computationally tractable. However, there are scenarios in which implementation of ticketing on the user equipment is also beneficial. Examples of such scenarios follow. The first scenario is when the coverages of two networks might have a small (or no) overlap such that the base-station of one network does not receive the signals of the peer base-station. However, the users of two networks can interfere in this scenario. In this case, an attacker can target a UE without being detected.

Another scenario is the situation where one of several networks is compromised. Although an attacker may use a legitimate base-station to acquire the spectrum for its users, the attacker can hijack the spectrum without being detected. This is because the network acquires the spectrum while there is no check on the legitimacy of the users who occupy the spectrum. Yet another scenario is the case when a user equipment is legitimate for a high priority access level, but it is connected to a network which does not support that access level or a ticketing server. In this case, the user can establish a secure connection to the ticketing server, e.g., using an IPSec tunnel, and acquire the required ticket document. Then, the user may employ the ticket document to access the spectrum while other networks can verify the legitimacy of the user.

In these and other scenarios, it is desirable for all the users to show a ticket document 304 every time they access the spectrum. Further, in more aggressive spectrum sharing systems, beyond the coexistence of WiFi and 5G networks, users from various communication systems and protocols might access the shared spectrum. Hence, as a path toward a long-term evolutionary system, embodiments of the disclosure are suitable to implement a ticketing server 302 that is lightweight and can complement the DID-based ticketing.

A lightweight ticketing server 302 can be implemented with keyed-Hash functions. Rather than using a digital signature of a ticket document 304, a keyed-Hash of the ticket document 304 can be used as the secret token 306. Ticketing 302 server generates the required secret keys and shares the secret keys with all parties. A potential limitation of this method is the inability to generate different priority access levels. Embodiments of the disclosure may address this issue by incorporating priority secret fields in the ticket document 304, e.g., as shown in Table 1 and discussed above.

Conditions to implement different priority levels according to embodiments of the disclosure include, for example: the higher priority user (level-1) can generate a legitimate token 306 that the lower priority user (level-2) can verify; and the level-2 user cannot generate a legitimate token 306. In the example ticket document 304 in Table 1, the level-2 user receives a default value for the "Priority 1 Secret" field. The level-1 user receives both the default value of the level-2 user and a secret value which is only available to level-1 users. When the level-2 user requests access to the spectrum, it uses the default value and finds the digest of the ticket document 304. The level-1 user knows this token 306 belongs to a level-2 user; hence, it also uses the default value to calculate the digest of the ticket document 304 and compares it with the received digest of the ticket document 304. However, a related problem arises from how the level-1 user generates a token 306 that can be verified by level-2 user.

Figure 7:
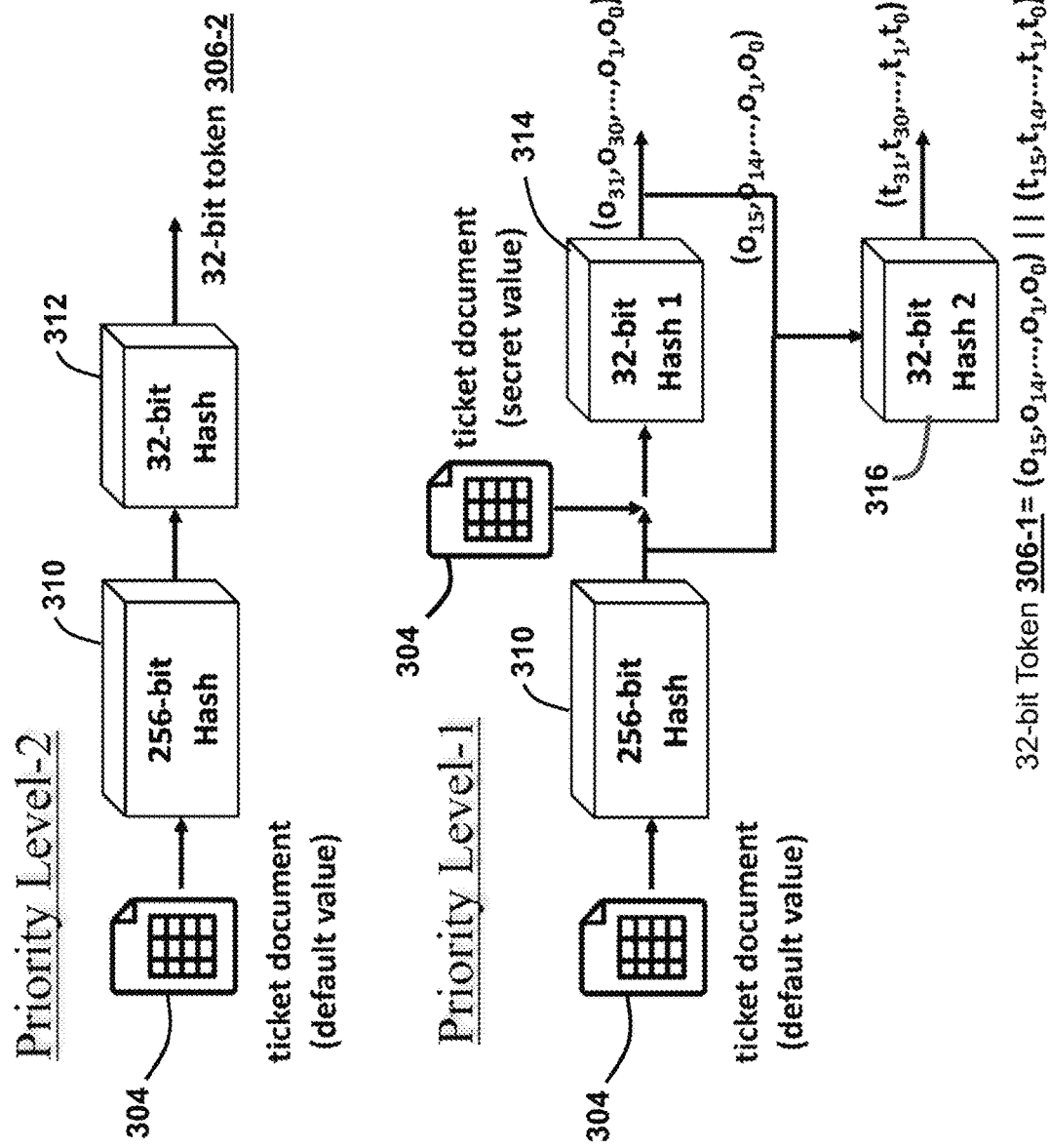
FIGS. 7 and 8 depict example processes to generate a token for different level users according to embodiments of the disclosure.
Figure 8:
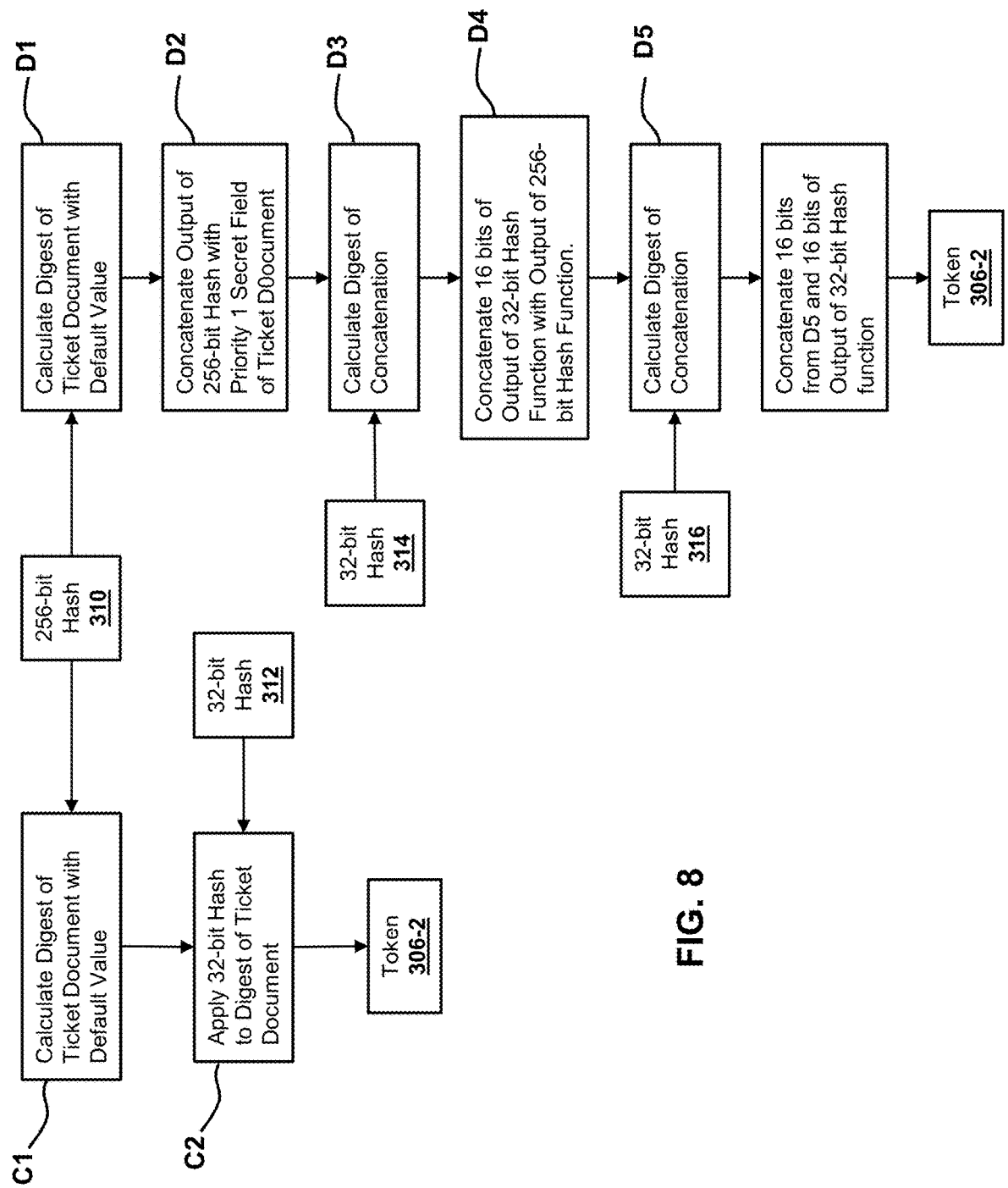

FIGS. 7 and 8 depict a process for generating a 32-bit token 306-1 for a level-1 user and a 32-bit token 306-2 for a level-2 user. At processes C1 and D1, the level-1 user and the level-2 user, respectively, calculate the digest of the ticket document 304 with the default value for the "Priority 1 Secret" field using a 256-bit Hash function 310. At process C2, the level-2 user applies a 32-bit Hash function 312 to the output of the 256-Hash function 310 to generate the token 306-2.

At process D2, the level-1 user concatenates the output of the 256-bit Hash 310 with the "Priority 1 Secret" field of the ticket document 304. Then, at process D3, the level-1 user calculates the digest of the concatenated value with a 32-bit Hash function 314 (this Hash function can be different from the 32-bit Hash function 312 used by the level-2 user). Next, at process D4, the level-1 user concatenates 16 bits of the output of the 32-bit Hash function 314 with the output of the 256-bit Hash function 310. At process D5, a second 32-bit Hash function 316 is used to calculate the digest of this concatenation (the second 32-bit Hash 316 is the same as the 32-bit Hash function 314 used by level-2 user). The eventual 32-bit token 306-1 is obtained by the level-1 user at process D6 by concatenating 16 bits of the output of the 32-bit Hash 316 and the 16 bits that were concatenated with the 256-bit digest 310.

By comparing the two token generation mechanisms, the level-2 user has all the required information to verify the legitimacy of the token 306-1 generated by the level-1 user. The 256-bit digest generated by level-1 user can be replicated by the level-2 user. The 16-bits concatenated with the 256-bit digest at the input of 32-bit Hash 316 function are also available in the transmitted token 306-1. However, the level-2 user cannot generate a valid level-1 token 306-1. Only a user who has access to the priority 1 secret value can replicate the output of the 32-bit Hash 316.

Figure 9:
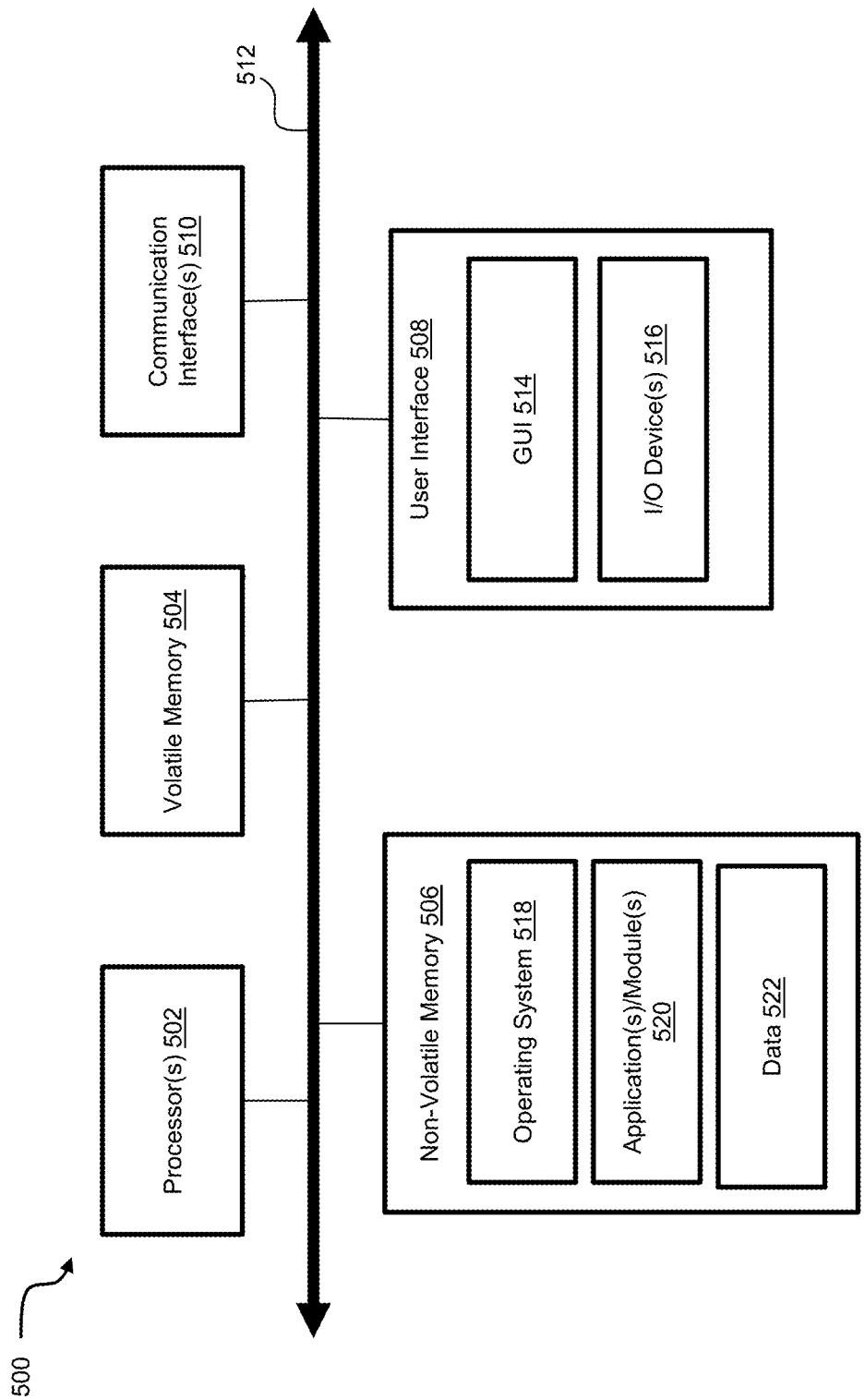
FIG. 9 depicts a computing system according to embodiments of the disclosure.

Turning to FIG. 9, embodiments of the disclosure may be implemented using a computing device/system 500. The computing device 500 may be integrated into a WiFi device 102, 5G network base station (5G gNB) 104, 5G NR-U module 106, UE 108, Wi5G module 110, WiFi sniffer 112, ticketing server 302, and/or other components described herein, or may be an independent device connected to such components.

The computing system 500 may include one or more processors 502, volatile memory 504 (e. g., RAM), non-volatile memory 506 (e. g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 508, one or more communications interfaces 510, and communication bus 512. The user interface 508 may include a graphical user interface (GUI) 514 (e.g., a touchscreen, a display, etc.) and one or more input/output (I/O) devices 516 (e.g., a mouse, a keyboard, etc.).

The non-volatile memory 506 stores an operating system 518, one or more applications/modules 520 and data 522 such that, for example, computer instructions of operating system 518 and/or applications 520 are executed by processor(s) 502 out of volatile memory 504. Data 522 may be entered using an input device of GUI 514 or received from I/O device(s) 516. Various elements of computing system 500 may communicate via communication bus 512. The computing system 500 as shown in FIG. 9 is shown merely as an example, as the various components described herein may be implemented by any computing or processing environment and with any type of machine or set of machines that may have suitable hardware and/or software capable of operating as described herein.

The processor(s) 502 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed signal. In some embodiments, the "processor" may be one or more physical processors or one or more "virtual" (e.g., remotely located or "cloud") processors. The communications interfaces 510 may include one or more interfaces to enable the computing system 500 to access a network such as a LAN, a WAN, or the Internet through a variety of wired and/or wireless or cellular connections.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified in at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A method for controlling admission of users to a communications network, the method comprising:
   determining whether an incoming transmission is an authentication request from a new user;
   issuing a temporary authentication to the user to transmit a set of access requirements to the user;
   performing, by a zero-trust engine, a risk assessment based on network activity data associated with the user;
   implementing a dynamic security policy action based on the risk assessment, the dynamic security policy action including at least one of gating access, refreshing keys, re-authenticating the user, or controlling issuance of a long-term authentication;
   determining whether a reply from the user complies with the set of access requirements; and
   issuing the long-term authentication to the user in response to the reply complying with the set of access requirements and in accordance with the dynamic security policy action.

2. The method of claim 1, wherein the user, after receiving the temporary authorization:
   generates a temporary ticket document; and
   proceeds with an authentication protocol of a respective network of the user.

3. The method of claim 2, further comprising:
   determining if the temporary ticket document is still valid;
   determining if the user has been successfully authenticated with the user's respective network; and if the temporary ticket document is still valid and the user has been successfully authenticated, issuing the long-term authentication to the user.

4. The method of claim 1, further comprising:
generating, by the user, a long-term ticket document in response to the long-term authentication; and
sending an access request to share a spectrum of the network, wherein the access request includes the long-term ticket document.

5. The method of claim 4, further comprising sending a secret token to the network with the access request.

6. The method of claim 5, further comprising generating the secret token based on the long-term ticket document.

7. The method of claim 6, wherein the secret token comprises a keyed HASH of the long-term ticket document.

8. The method of claim 1, wherein the set of access requirements includes at least one RF-coexistence parameter.

9. The method of claim 8, wherein the at least one RF-coexistence parameter includes a listen-before-transmit (LBT) category of the user, an energy-detection threshold, or a contention-window size of the user.

10. A ticketing system for controlling admission of users to a communications network, the ticketing system configured to perform actions including:
determining whether an incoming transmission is an authentication request from a new user;
issuing a temporary authentication to the user to transmit a set of access requirements to the user;
performing, by a zero-trust engine of the ticketing system, a risk assessment based on network activity data associated with the user;
implementing a dynamic security policy action based on the risk assessment, the dynamic security policy action including at least one of gating access, refreshing keys, re-authenticating the user, or controlling issuance of a long-term authentication;
determining whether a reply from the user complies with the set of access requirements; and
issuing the long-term authentication to the user in response to the reply complying with the set of access requirements and in accordance with the dynamic security policy action.

11. The system of claim 10, wherein the ticketing system is further configured to perform actions including:
receiving a temporary ticket document from the user;
determining if the user has been successfully authenticated with a respective network of the user; and
if the temporary ticket document is still valid and the user has been successfully authenticated, issuing the long-term authentication to the user.

12. The system of claim 11, wherein the ticketing system is further configured to perform actions including receiving an access request from the user to share a spectrum of the network, wherein the access request includes:
a long-term ticket document generated by the user in response to the long-term authentication; and
a secret token, wherein the secret token is generated based on the long-term ticket document.

13. The system of claim 10, wherein the set of access requirements includes at least one RF-coexistence parameter.

14. The system of claim 13, wherein the at least one RF-coexistence parameter includes a listen-before-transmit (LBT) category of the user, an energy-detection threshold, or a contention-window size of the user.

\* \* \* \* \*